(12) United States Patent
Nykänen

(10) Patent No.: US 6,362,841 B1
(45) Date of Patent: Mar. 26, 2002

(54) METHOD FOR FORMING AN ICON

(75) Inventor: Petri Nykänen, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/253,126

(22) Filed: Feb. 19, 1999

(30) Foreign Application Priority Data

Feb. 27, 1998 (FI) .................................................. 980464

(51) Int. Cl.[7] .............................................. G06F 13/00
(52) U.S. Cl. ...................................... 345/835; 345/764
(58) Field of Search ................................ 345/326, 339, 345/341, 349, 355, 356, 357, 700, 764, 784, 835, 839, 848, 853, 854; 709/202, 203, 218, 219

(56) References Cited

U.S. PATENT DOCUMENTS

| | | | |
|---|---|---|---|
| 5,689,286 A | | 11/1997 | Wugofski |
| 5,809,115 A | | 9/1998 | Inkinen |
| 6,108,003 A | * | 8/2000 | Hall et al. ................... 345/340 |
| 6,144,997 A | * | 11/2000 | Lamming et al. ........... 709/217 |
| 6,173,316 B1 | * | 1/2001 | De Boor et al. ............ 709/218 |
| 6,208,659 B1 | * | 3/2001 | Govindarajan et al. ..... 345/333 |

FOREIGN PATENT DOCUMENTS

JP         06337741 A      12/1994

* cited by examiner

Primary Examiner—Cao H. Nguyen
(74) Attorney, Agent, or Firm—Perman & Green, LLP

(57) ABSTRACT

The invention relates to a method for forming a device-specific icon (22,23) related to an external device (MS1, MS2, MS3) in a data processor (PC), in which the optical properties of the pixels are changed in order to present desired information. In this method, a local area link is established in order to transmit information between the said data processor and external device (MS1, MS2, MS3). In the external device (MS1, MS2, MS3) or in a determined communications address at least some device-specific information has been stored in advance. The icon information required to form the icon (22,23) is transmitted to the data processor (PC) from the external device (MS1, MS2, MS3), or the address indicating the storage location of the icon information is transferred to the data processor (PC) from the external device (MS1, MS2, MS3), wherein at least some of the icon information is transmitted from the storage location indicated in the storage address with the help of the data processor (PC). On the basis of the transmitted icon information the optical properties of the pixels in the display of the data processor (PC) are controlled in order to form and present an icon according to the icon information on the display (4).

19 Claims, 4 Drawing Sheets

METHOD FOR FORMING AN ICON

BACKGROUND OF THE INVENTION

1. Field of the Invention

The present invention relates to a method according to the introductory part of the appended claim 1 for forming an icon in a data processor related to an external device. The invention also relates to a wireless communication device according to the introductory part of the appended claim 8.

2. Brief Description of Related Developments

When developing the operating systems of computers, attention has been paid to the user interface as well. Modern user interfaces contain a graphical user interface (GUI), in which visual information can be presented in a variety of ways. Microsoft Corporation, for example, has created the Windows® operating system, which contains a graphical user interface. This user interface also includes the so-called windowing, where a separate space ("window") can be reserved in the display for the information presented by different applications. The size and location of this space can be changed according to the need. The window can also be minimized into a so-called icon without closing the application program, and thus a small icon is shown in the display, indicating that this application program is on. In the graphical user interface application, programs installed in the computer can also be presented as icons, by means of which the application programs can be started up.

An icon is usually a space of a particular size, variable in its shape in the display. The icon is presented by means of the pixels of the display so that their colour and brightness varies according to what kind of visual appearance has been determined for the icon. The information of the icon is composed of icon elements organized preferably in vertical and horizontal lines, wherein each icon element corresponds to the information of one pixel in a basic size icon. When enlarging the icon, the information of one icon element can be used correspondingly in adjusting the colour and brightness of several pixels. As is well known, the pixel of the RGB colour display is composed of three colour components: red, green and blue. By varying the brightness of these three components, it is possible to present multi-colour information (so-called full colour display). The icon information is advantageously stored in a memory so that for each icon element, one 8 bit storage space is reserved for each colour component. Thus each icon element requires 24 bits, in other words, 3 bytes of storage. In the Windows® operating system, the information of one icon is typically about one kilobyte.

Data transmission between computers and other devices connectable to them is typically implemented by means of a cable, so that a data transmission cable is connected between the devices. In office use, there may be several computers and other equipment such as printers, which are connected locally in a local area network. This local area network is normally implemented with cabling, for example with Ether-net cabling. Recently, however, wireless coupling methods have been developed, for example, data transmission systems for short distances, which function with the help of infrared or radio signals. The use of wireless data transmission systems like these is easier because the user does not have to connect the cables in various devices, all that is required is that the equipment is in the operating range of the data transmission system. Regardless of the technique used to implement this data transmission system, the features of the equipment typically need to be specified and the functional parameters to be set. The computer needs to receive information about the types of the devices (printer, telecopier, wireless communication device, modem) which are in data transmission connection with it, in order to use the right data transmission mode. Normally this is implemented so that the user starts up an installation program in the computer in which all the procedures required for defining the device in question in the operational environment of the computer have been programmed. The device, such as a printer or a wireless communication device, is accompanied with a diskette or CD ROM, containing this installation program. In connection with the installation program, information can usually also be found about the so-called icon. This icon can be output on the computer display, for example, if the wireless communication device is in the vicinity of the data processor. The user can usually move the icon to a desired location on the display and even change the size of the icon. The visual appearance of the icon does not, however, change when its size and location is changed. A defect in this system is, for instance, that the visual appearance of the icon contained in the installation program cannot be changed. Usually a diskette with the same contents is enclosed in every sales package of the device, e.g. for the reason that it is difficult and uneconomic to produce an individual diskette for every package. Different manufacturers may have different icons, but each manufacturer typically uses the same kind of icon in connection with its own wireless communication devices. This may cause confusions, especially in situations where the user has several wireless communication devices with somewhat different properties. If application programs installed in the computer for these wireless communication devices are represented with the same icon, but possibly with a different name, there is a great risk of mix-up: the user may accidentally start up a wrong application program. Problems are also caused by such possible situations where the user has a wireless communication device, but the corresponding application program is not installed in the computer. Thus, a general purpose application program can be used, by means of which at least some of the basic functions of the wireless communication device are available. The icon of this application program can, however, be misleading; it can, for example, represent a totally different wireless communication device. Therefore, it is not necessarily clear to the user that this is, however, the icon with which the application program for controlling the wireless communication device in question is set to work.

The wireless communication devices represented in FIG. 1 may be quite different as far as their features are concerned, even though they all are telecommunication terminals. One wireless communication device may only contain basic functions such as answering a call and call setup. Another wireless communication device may also include features such as sending and receiving text messages, as well as data features. Furthermore, a third wireless communication device may, in addition to telephone features, also contain data processing features, such as calendar functions, notebook functions, or the like.

SUMMARY OF THE INVENTION

One of the purposes of the present invention is to bring about a method for forming a device-specific icon on a data processor display in which the optical properties of the of pixels are changed in order to represent desired information. The information of the icon is retrieved, for example, from an external device, such as a wireless communication device, or on the basis of a search address transmitted from an external device to the data processor. The method according to the present invention is primarily characterized in what will be presented in the characterizing part of the appended claim 1. The wireless communication device according to the present invention is primarily characterized in what will be presented in the characterizing part of the appended claim 8. The invention is based on the idea that icon information or the search address of the icon information is retrieved from external devices, such as wireless communication devices in the vicinity of the host device.

The present invention gives considerable advantages compared to methods and wireless communication devices of prior art. When using a method according to the invention, application programs used to control wireless communication devices which are in the vicinity of the host device, can be distinguished on the basis of different icons. The icon can even be changed when the features of the wireless communication device are changed. Also, the icon can be changed for a program which is being used to control several different wireless communication devices. Thus the icon is changed in accordance with the wireless communication device which is in the vicinity of the data processor at a given time. Icons which can be changed according to the invention are more easily distinguishable from each other, thereby reducing the risk of mix-up. When utilizing a method according to the invention, it is not necessary to use a standard icon in connection with different application programs, but it is possible to dynamically design an individual icon for each application program. Since, for example, mobile stations are individually programmed in order to store, for instance, the device-specific IMEI code (International Mobile Equipment Identity), it is possible to advantageously store the information of at least one individual icon at the same time.

BRIEF DESCRIPTION OF THE DRAWINGS

The invention will be described in more detail with reference to the appended figures, in which.

DETAILED DESCRIPTION OF THE PREFERRED EMBODIMENT

In the following, the invention will be described by using infrared data transmission according to IrDA standard as an example of the short distance data transmission system. Hereinbelow in this description, the term local area link will be used for this short distance data transmission system. Correspondingly, the term data transmission means of the local area link will be used for the data transmission means implementing this local area link, which include, for example, a local area link transmitter and a local area link receiver. It is obvious that the invention can also be applied by using other known data transmission systems, such as Low Power RF (LPRF) or data transmission via cable. A wireless communication device, such as a mobile station according to the Global System for Mobile Communications (GSM), provides an example of an external device, but it is obvious that the invention can also be applied to devices other than wireless communication devices.

Figure 1:
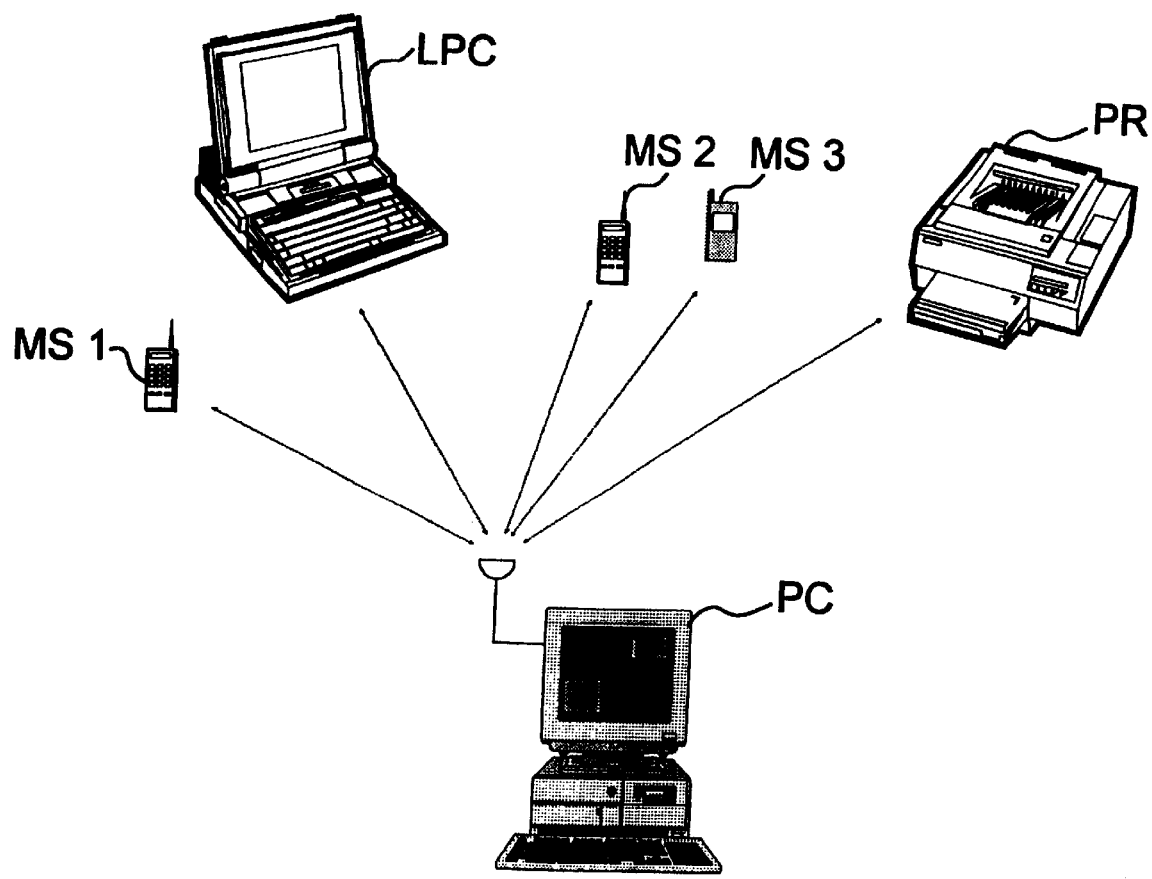
FIG. 1 shows a data transmission system for short distances based on infrared data transmission.

Infrared data transmission has been found relatively effective in close range since connecting cables can be avoided and the different devices can be placed more freely. Nevertheless, in infrared data transmission one has to take into account that between communicating devices there either has to be unobstructed visibility or the possibility to establish an optical connection via reflective surfaces. Different standards have been developed for this kind of infrared data transmission, for example the IrDA standard (Infrared Data Association). FIG. 1 shows a method in which infrared data transmission has been utilized between different devices. As an example the system presents a desktop computer PC to which it is possible to connect a lap-top computer LPC, a printer and different wireless communication devices, such as mobile stations via infrared data transmission. In infrared data transmission according to the IrDA standard, it is possible to identify these infrared devices in the vicinity of this desktop computer. This desktop computer in a system according to FIG. 1 is a so-called host device, which functions as a device for controlling the system. Each device which contains means for infrared data transmission, contains stored identification data, such as the name of the device, the dynamically definable address of the device, and state variables for indicating the services supported by the device. The state variables indicate, for instance, which service class the device in question belongs to. Such service classes include, for example, a personal computer, a printer PR, a plug and play type device, a telecommunication terminal (telephone), etc. Thus, the wireless communication devices in the vicinity of the host device can be defined on the basis of this service class definition by examining the value of the telecommunication terminal state variable. The data on the devices supporting infrared data transmission which the host device has detected and identified is stored by the host device into its storage means.

In a situation where a new device suitable for infrared data transmission enters the vicinity of a computer, a corresponding identification of the device is performed. This device is detected for example in such a way that the host device transmits at intervals a query message, to which a reply message is transmitted by the devices that are located in the vicinity of the host device and are suitable for infrared data transmission. This reply message is received by the host device and used for defining for instance the service class of the device.

The aforementioned data transmission system according to the IrDA standard is based on a sandwich structure of seven layers called OSI (Open Systems Interconnection) presented by the International Standards Organization ISO. The IrDa standard protocol stack comprises the lowermost layer of the said OSI sandwich structure, i.e. the physical layer, the data link layer above that, the following network layer, and the uppermost layer, i.e., the application layer.

The implementation of the physical layer may vary in different devices. Usually data transmission according to the IrDA-SIR specification is used, by means of which the speed 115.2 kbit/s can be achieved. Also faster infrared data transmission has been suggested for the IrDA standard (FIR, Fast Infra Red) in which the speeds 1.152 Mbit/s and 4 Mbit/sec have been defined.

The abbreviation IrLAP is used to indicate the data link layer protocol. This protocol supports the identification of devices and the service that secures reliability. In this protocol layer other devices are also informed that infrared data transmission is usable in this device.

The abbreviation IrLMP is used to indicate the network layer protocol. This protocol supports connection set-up on the service level and multiplexing of different data transmission streams.

The application layer contains services needed by the applications used in the device. One service required in every IrDA device is a so-called Information Access Service (IAS). This information access service includes a so-called server service and a client service. The client service is able to make enquiries to the server service in order to find out which services are supported by the host device. The server service retrieves the inquired information from a local database, such as a database stored in the storage means of a desktop computer. This database contains service specific information.

Figure 3A:
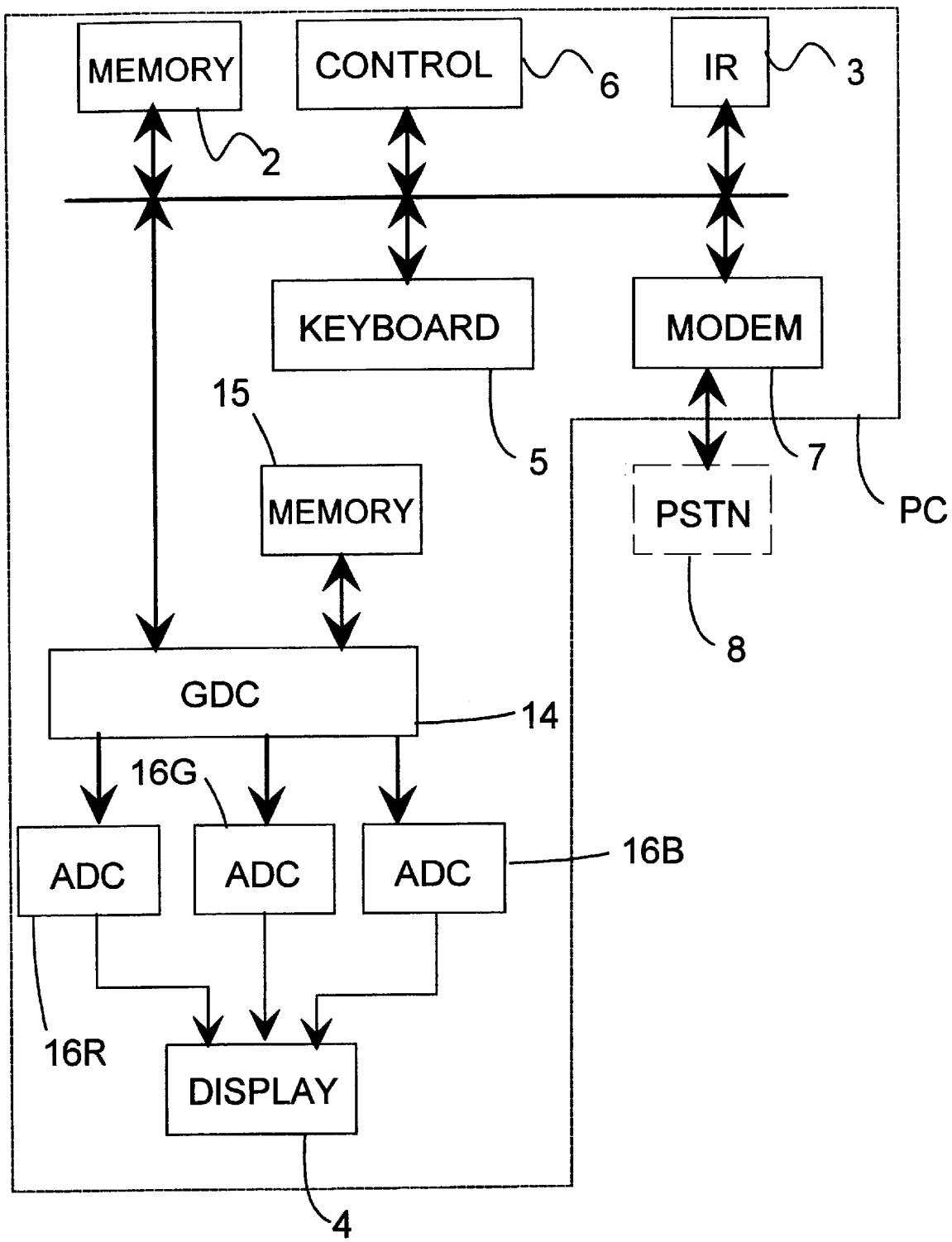
FIG. 3a shows an electronic data processor in a reduced block diagram.

In the system 1 presented in FIG. 1, the host device is a data processor PC, such as a personal computer, one preferred embodiment of which is presented in a reduced block diagram in FIG. 3a. This data processor PC contains storage means 2, such as a Read Only Memory ROM and a Random Access Memory RAM and a writeable mass storage (hard disc). In addition, the data processor PC includes data transmission means 3 of the local area link, in this case infrared data transmission means according to the IrDA standard, which contain, for instance, a transmitter and a receiver. The data processing device also contains a user interface UI, with a display 4 and a keyboard 5. To control the functions of the data processor, a control unit 6 is used, which typically includes a central processing unit (CPU), a micro controller, or the like.

The storage means 2 of the data processor PC, for example in a writeable mass storage, contain a stored operating system which includes program commands for accomplishing different functions in the data processor PC. With the help of this operating system, the user can start up application programs installed in the storage means 2 of the data processor PC, which is known as such. In the operating system, the so-called device controllers are typically also loaded, by means of which it is possible to examine and read the pressings of the keys on the keyboard and to control other functional blocks of the data processor PC, for example the data transmission means 3 of the local area link and modem 7. With the help of the modem 7, the data processor can be coupled, for example, to a landline telecommunication network, wherein a data transmission connection can be established from the data processor to another, more distant data processor, for example via the Internet communication network.

To control the display 4 the data processor PC is provided with a graphic display controller 14 (GDC), for the purpose of establishing, for instance signals for the pixel which are used to control the pixels of the display on the basis of the colour and brightness desired at a given time; updating the image information of the display 4 at intervals, for example updating the whole picture 75 times in one second; establishing the timing signals required, etc. The structure of the display 4 affects how, for example, the control signals and synchronizing signals are generated. Known display types are for example cathode ray tube display (CRT) and liquid chrystal display (LCD). However, the display type as such is not significant for applying this invention, and thus it is not necessary to discuss it in more detail in this context. The functional descriptions of the invention can be applied by a man skilled in the art according to the display type used at a given time.

The image information stored in the display memory 15 is read by a graphic display controller 14 and used for generating the signals required to control the display 4. The image information in the display memory 15 is in binary form, usually 8 bits per colour component, wherein it is possible to produce 256 brightness levels for each colour component (R, G, B). In an data processor according to FIG. 3a, three digital/analog (D/A) converters 16R, 16G, 16B are arranged in connection with the graphic display controller for converting the binary numerical value of the colour component into an analog signal to be transmitted to the display 4. The display memory 15 contains preferably three areas, one for each basic colour. In each area there is advantageously one byte per each pixel. These bytes are typically arranged so that the first byte corresponds to the pixel on the upper left corner of the display 4, the next byte corresponds to the adjacent pixel in the horizontal direction etc. Thus, the last byte corresponds to the pixel in the lower right corner of the display 4. For the sake of clarity, the display memory is presented as one block in FIG. 3a. Even though the display memory 15 and the storage means 2 of the data processor are presented in separate blocks, in practical applications they can also be implemented by using the same memory circuit, wherein a separate storage space in these memory circuits is reserved for the display memory.

The information presented on the display 4 is advantageously updated in the following way. The controller 6 of the data processor transmits the address of the pixels to be changed and the new colour and brightness data of the pixels. The graphic display controller 14 changes new values into the storage locations corresponding to these pixels in the display memory. The display 4 is updated when it is time to update the changed pixels, which is known as such. The display 4 can also be updated in fields, wherein the controller 6 transmits to the graphic display controller 14 the starting point of the field to be changed, for example the xy-coordinates of the upper left corner of the field to be changed and the terminal point, for example the xy-coordinates of the lower right corner of the field. In addition, the controller 6 transmits to the graphic display controller 14 the new value for each of the pixels in this field. In some applications, it is possible to perform computing in the graphic display controller 14, wherein the controller 6 transmits the parameters to the display controller 14, on the basis of which it calculates the pixels to be changed and new values for them. This is, for example, applicable for drawing regular patterns, such as lines and circles. In this description, the above-described updating in fields is used to update the icon, wherein when forming and updating the icon the field has the size of the icon.

The device-specific icon in this description is not necessarily different for all various external devices MS1, MS2, MS3, but it is also possible to design, for example for the same external device model a similar, device-specific icon, for external devices of the same type a similar device-specific icon, or for the external devices of the same manufacturer a similar icon. A device-specific icon can also be formed for external devices produced for the purpose of a particular campaign, or for a particular production lot of the external device.

The system described in FIG., also presents several wireless communication devices MS1, MS2, MS3. These wireless communication devices MS1, MS2, MS3 can be different, but they all contain certain basic blocks, on the basis of which the operation of this invention can be understood with respect to the wireless communication devices MS1, MS2, MS3. Even though in connection with the wireless communication device reference will be primarily made only to the first wireless communication device MS1, it is obvious that instead of this also other wireless communication devices MS2, MS3 can be used.

Figure 3B:
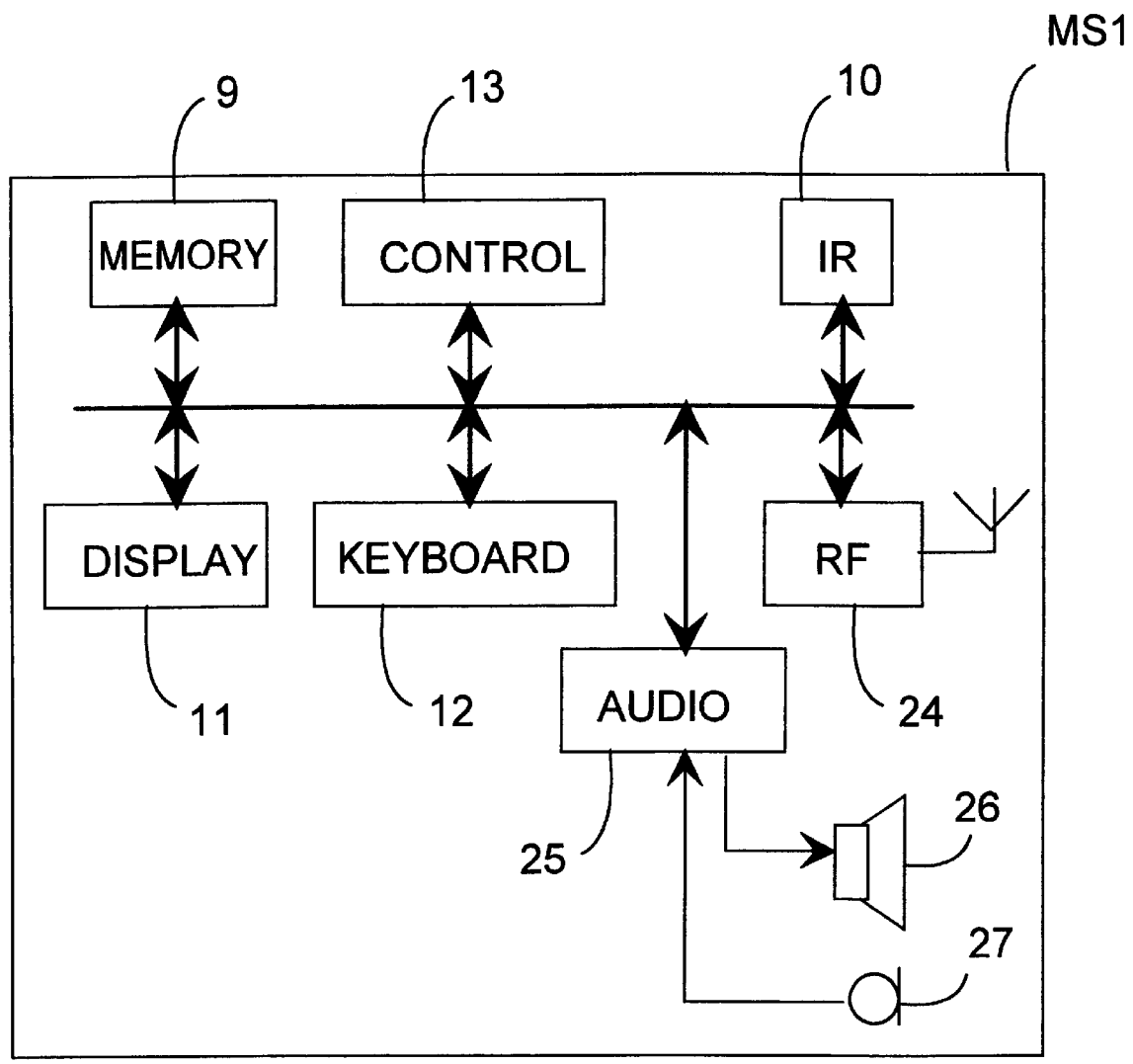
FIG. 3b shows a wireles station in a reduced block diagram.

FIG. 3b presents an advantageous embodiment of a wireless communication device MS1 in a reduced block diagram. It comprises storage means 9, such as a read only memory and a random access memory, second local area link data transmission means 10, in this case infrared data transmission means according to the IrDA standard, which contain e.g. a transmitter and a receiver. The wireless communication device MS1 also contains a user interface with a display 11 and a keypad 12. To control the functions of the wireless communication device MS1, MS2, MS3, a control unit 13 is used, which typically includes a microprocessor CPU (Central Processing Unit), a microcontroller, or the like. In addition, FIG. 3b shows a radio unit 24 for setting up a data transmission connection to a mobile communication network (not shown) and means for processing audiosignals, such as an audio block 25 a receiver/speaker 26 and a microphone 27.

Figure 2:
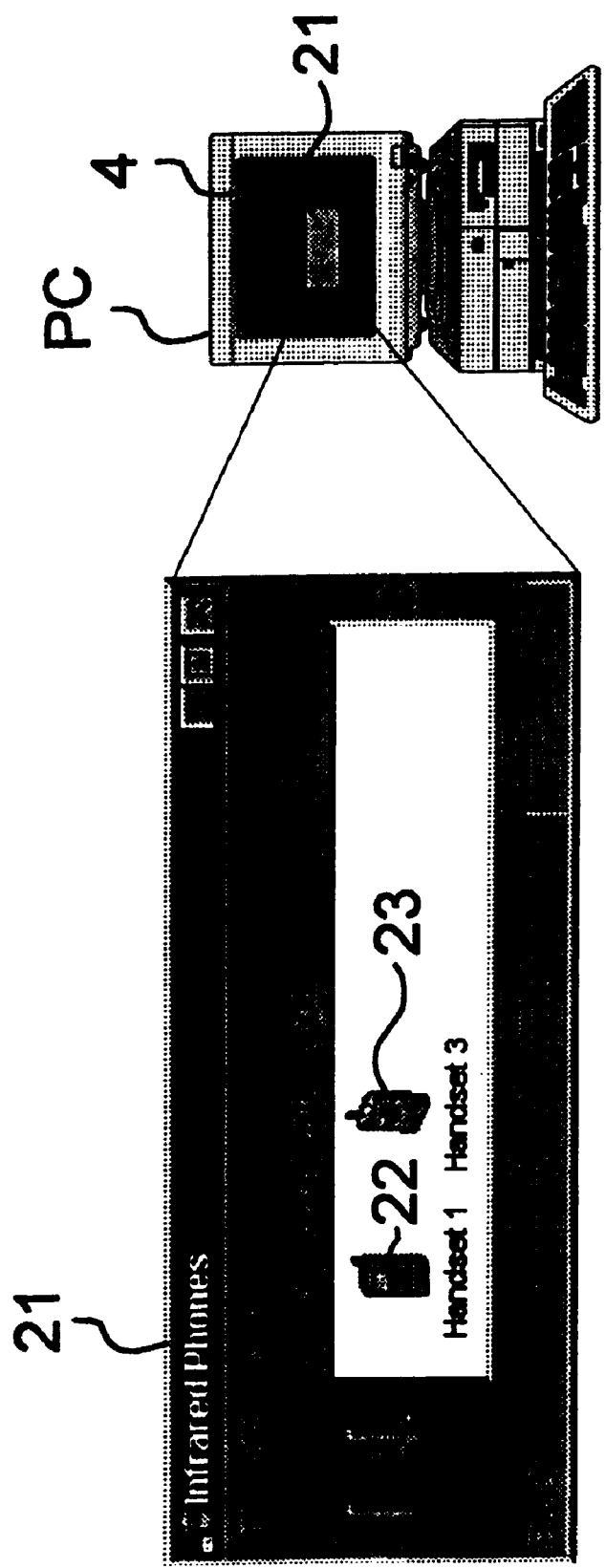
FIG. 2 shows as an example an information window according to a graphical user interface.

In the following, the operation of a method according to one preferred embodiment of the invention will be described. The control application program of the local area link is started in the data processor PC. This application program forms an application information window 21 on the display 4. An example of this is the information window 21 according to FIG. 2. In connection with the startup it has been defined in the data processor PC, which devices in the proximity are connectable to the local area link. From these devices, which in this case are the first MS1 and the second wireless communication device MS2, the icons 22,23 are formed in the information window 21. In a situation where a new device is brought in a near distance to the data processor PC, the data processor PC detects the message transmitted by the device and starts a device identification process. From the data processor PC, a query message is transmitted to the device. The device receiving the query message transmits a reply, in which the device reports indentification data. One query message can be used for finding out identification data transmitted by several different devices, in which case each device transmits the data at different times. The reply message, according to the IrDA standard, contains information on the address of the device which in this standard contains 32 bits. This address data can vary in different applications, and each device should have a different address. This address can also be given in connection with the identification stage, wherein the data processor PC preferably defines the address and transmits the address data to the device in question. The reply message also contains information on the services supported by the device, which is a field containing few state variables. These state variables can report, for example, whether it is a telecopier, modem, telephone, personal digital assistant (PDA), printer, etc. in question. Also, in the reply message, a name is set for the device, which the user of the device has stored in the storage means of the device. The name is typically a character string. The received information is stored in the storage means 2 of the data processor PC. It is also examined whether the wireless communication device in question is previously unidentified, in which case the information of the icon of this wireless communication device is added into the storage means of the data processor. The information of the icon is advantageously transmitted from the storage medium 9 of the wireless communication device via the local area link. Reference is made in this context to the parallel patent application of the applicant in which this identifying process is described in more detail.

Before retrieving the icon information, the data processor PC can make a search in the IAS database of the wireless communication device MS1, MS2, MS3 or the like whether the wireless communication device in question contains icon information or the search address for the icon information.

The data processor PC contains advantageously a wireless communication device type table or the like, which contains certain basic information on each different wireless communication device MS1, MS2, MS3 which is or has been in the operating range of the local area link.

The icon information is then stored in the data processor PC preferably in connection with the wireless communication device type table. The icon information of the wireless communication device MS1, MS2, MS3 is transmitted to the graphic display controller 14, which updates the display memory 15 correspondingly. The location of the icon can be placed, for example, in a space reserved for this purpose in the information window 21.

If a wireless communication device MS1, MS2, MS3 which has entered the local area link, has already been identified earlier, and its icon 22,23 has been loaded, it is possible to examine at this stage whether it has changed. This can be performed, for example, on the basis of version number or other corresponding information. The icon 22,23 could be changed, for example, in connection with the version updating of the wireless communication device. Thus a method according to the invention makes it possible that the icon 22,23 in the data processor PC is always updated according to the latest version.

Icon information can in some applications be retrieved also from a storage space other than the storage means 9 of the wireless communication device. Possible search locations include the Internet communication network, the local area network of an office, or a diskette. In this case, a search address is stored in the storage medium 9 of the wireless communication device, for example, a URL address (Universal Resource Locator), for instance "http://www.firm.com/icons/mobile.ico" in which "http" indicates Hypertext Transfer Protocol, a data transmission protocol generally used in the Internet; "www.firm.com." is the Internet home page server address of a company called firm, and "icons/mobile.ico" define the location of the file in this server. With the data processor PC, a data transmission connection can be set up via the modem 7 and a telecommunication network such as landline tele-communication network 8, to the location given in the search address, and the search and updating of the icon information can be done correspondingly.

The representation form of the icon information may vary in different applications, but the following character string provides one example "10;0;5,5,0;10,10,0;10,10,0;7;1;255, 127,0;255,127,0;10;3;0,0,255;0,25 5,0;255,0,0;0". The numbers in the character string of this example represent 8 bit information, thus each number can obtain a value from 0 to 255. The presumption in this example is that in the icon information, the process of defining the icon begins from the top of the icon, proceeding from left to right and from top to bottom. The shape of the icon is not necessarily regular. The first number indicates the number of figures defining the first line, which in here is 10. The next byte (0) indicates the starting point of the first line with respect to the location defined for the icon, which can be given, for example, in an application program. This is followed by the brightness of each colour component defined in groups of three numbers advantageously in such a way that the colour component with the numerical value 0 is dark and the colour component with the numerical value 255 has maximum brightness. In each group, the first number indicates the brightness of the red colour component, the second number indicates the brightness of the green colour component, and the third number indicates the brightness of the blue colour component. Thus the first line contains three colour components. This is followed by the information of the next line: the number of figures defining the line (7), the starting point of the line (1) and definitions for the colour components (2×3). After this follows the information of the third line. Icon information according to this example ends when the information on the number of figures is 0, in other words after the third line defining the icon. In practice, the information defining one icon is multiple with respect to the above description.

The present invention can also be applied in such a way that device-specific icon information is formed from two or more different icon information elements. For example, in a wireless communication device according to the GSM system, a subscriber-specific authentication card SIM (Subscriber Identity Module) (not shown) is used, in which subscriber-specific information, such as telephone number, has been stored. Thus it is possible to combine, for example, a phone number with the icon information stored in a wireless communication device, wherein in a device-specific icon presented in the display 4 of the data processor PC, a slightly different icon can be represented for the different users of the same external device. This kind of user-specific information, for example the name of the user, can also be retrieved from a so-called Business Card type card (not shown), which is connectable at least in the Nokia 9000 Communicator.

The present invention is not restricted solely to the embodiments presented above, but it can be modified within the scope of the appended claims.

What is claimed is:

1. A method for forming a device-specific icon (22,23) related to an external device (MS1, MS2, MS3) in a data processor (PC), in which the optical properties of pixels are changed in order to present desired information, comprising the steps of
    a local area link is established in order to transmit information between said data processor (PC) and external device (MS1, MS2, MS3),
    at least some device-specific icon information has been previously stored in the external device,
    the icon information required to form an icon (22,23) is transmitted to the data processor (PC) from the external device (MS1, MS2, MS3),
    and that on the basis of transferred icon information the optical properties of the pixels in the display (4) of the data processor (PC) are controlled in order to form and present an icon according to the icon information on the display (4).

2. A method according to claim 1, comprising the step of the icon information being retrieved at the stage when the external device (MS1, MS2, MS3) is identified, wherein the retrieved icon information is stored in the data processor (PC).

3. A method according to claim 1, in which it is possible to set up a data transmission connection from the data processor (PC) to the Internet communication network, comprising the steps of the icon information being stored in a storage location in the Internet communication network, and a URL address, or the like, is stored in the external device (MS1, MS2, MS3).

4. A method according to claim 1, comprising the step of the visual information presented in the display (4) is stored in a display memory (15).

5. A method according to claim 1, comprising the step of the icon information is transmitted in a wireless manner to the data processor (PC).

6. A method according to claim 1, comprising the step of the icon information is formed of icon information elements stored in two or more storage locations.

7. A method according to claim 1, comprising the step of the external device (MS1, MS2, MS3) is a wireless communication device.

8. A wireless communication device (MS1, MS2, MS3), comprising means (3,10) for establishing a local area link for data transmission between a data processor (PC) and the wireless communication device (MS1, MS2, MS3), in which the data processor (PC) comprises a display (4) and means (14, 16R, 16G, 16B) for changing the optical properties of pixels in the display (4), and means for forming an icon on the display (4), the wireless communication device(MS1, MS2, MS3) comprises further: means (3,10) for establishing the local area link for the data transmission between the data processor (PC) and the wireless communication device (MS1, MS2, MS3), and icon information or a storage location address of the icon information stored in a storage medium (9) for forming an icon (22,23) related to the wireless communication device (MS1, MS2, MS3) in the data processor (PC).

9. A wireless communication device (MS1, MS2, MS3) according to claim 8, further comprising the icon information contains at least two icon information elements.

10. A wireless communication device (MS1, MS2, MS3) according to claim 9, further comprising at least one icon information element contains user-specific wireless communication device information, such as the name or phone number of the user.

11. A method for forming a device-specific icon (22,23) related to an external device (MS1, MS2, MS3) in a data processor (PC), in which the optical properties of pixels are changed in order to present desired information, comprising the steps of a local area link is established in order to transmit information between said data processor (PC) and external device (MS1, MS2, MS3), an address indicating storage location of the device-specific icon information is transmitted to the data processor (PC) from an external device (MS1, MS2, MS3), wherein at least some icon information is transmitted by the data processor (PC) from the storage location indicated in a storage address, and that on the basis of transferred icon information the optical properties of the pixels in the display (4) of the data processor (PC) are controlled in order to form and present an icon according to the icon information on the display (4).

12. A method according to claim 11, comprises the step of the visual information presented in the display (4) being stored in a display memory (15).

13. A method according to claim 11, comprises the step of the icon information being transmitted in a wireless manner to the data processor.

14. A method according to claim 11, comprises the step of the icon information being formed of icon information elements stored in two or more storage locations.

15. A method according to claim 11, comprises the step of the external device (MS1 MS2, MS3) being a wireless communication device.

16. An electronic device (MS1, MS2, MS3) comprising means (3,10) for establishing a local area link for data transmission between a second electronic device (MS1, MS2, MS3, LPC, PR, PC) and said electronic device (MS1, MS2, MS3), said electronic device comprising a display (4); and means (14, 16R, 16G, 16B) for changing the optical properties of pixels on the display (4); and means for forming an icon related to the second electronic device on the display (4) on the basis of a device-specific information which the second electronic device has provided to said electronic device.

17. An electronic device (MS1, MS2, MS3) according to claim 16, comprising the device-specific icon information or address of such device-specific icon information being provided by the second electronic device contains at least two icon information elements.

18. An electronic device (MS1, MS2, MS3) according to claim 16, further comprises that at least one icon information element contains user-specific communication device information, such as the name or phone number of the user.

19. An electronic device (MS1, MS2, MS3) according to claim 16, further comprises that at least one electronic device may be a wireless communication device.

* * * * *